Dec. 4, 1956  O. E. ROSS  2,772,809
TANK FILLER CAP
Filed Feb. 5, 1954  3 Sheets-Sheet 1
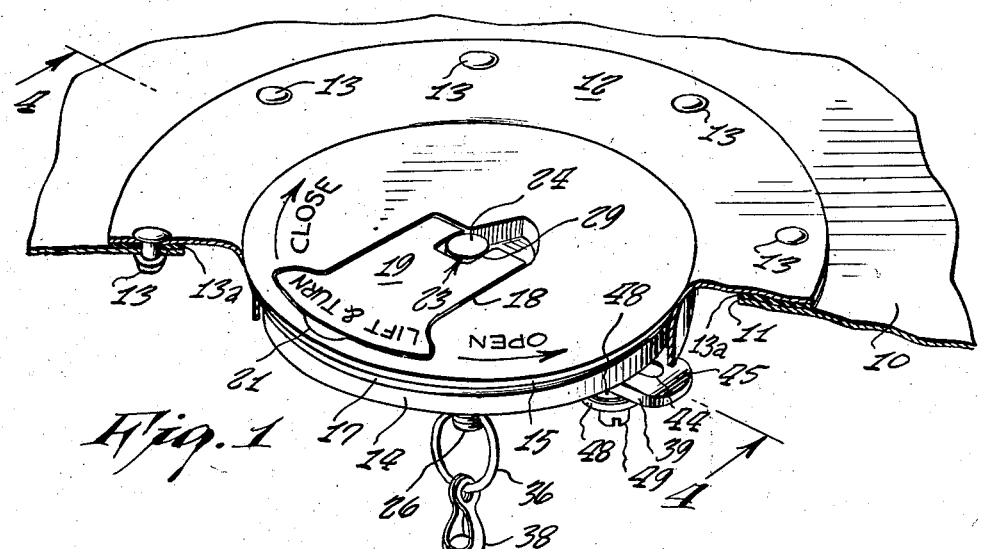
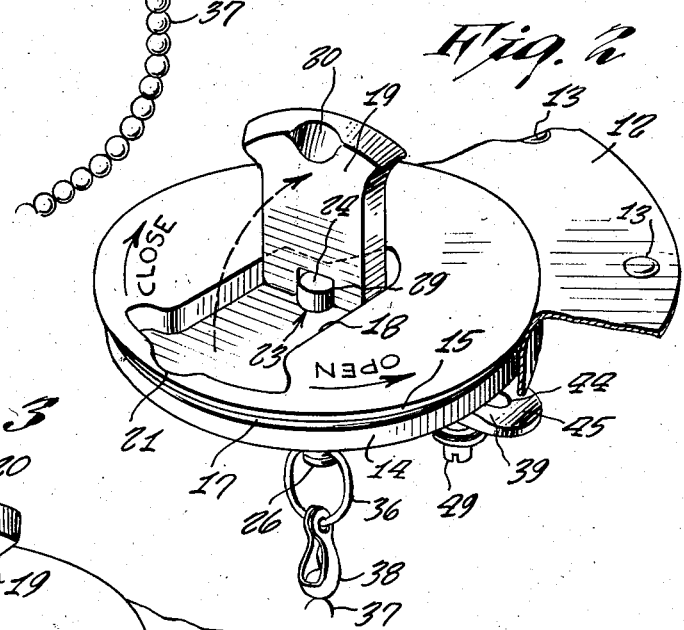
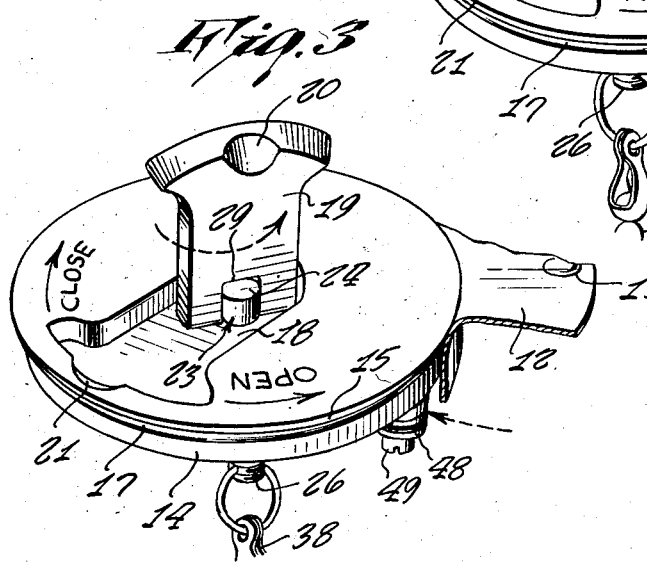
ORRIN E. ROSS
INVENTOR.
BY
ATTORNEY Dec. 4, 1956 O. E. ROSS 2,772,809
TANK FILLER CAP
Filed Feb. 5, 1954 3 Sheets-Sheet 2
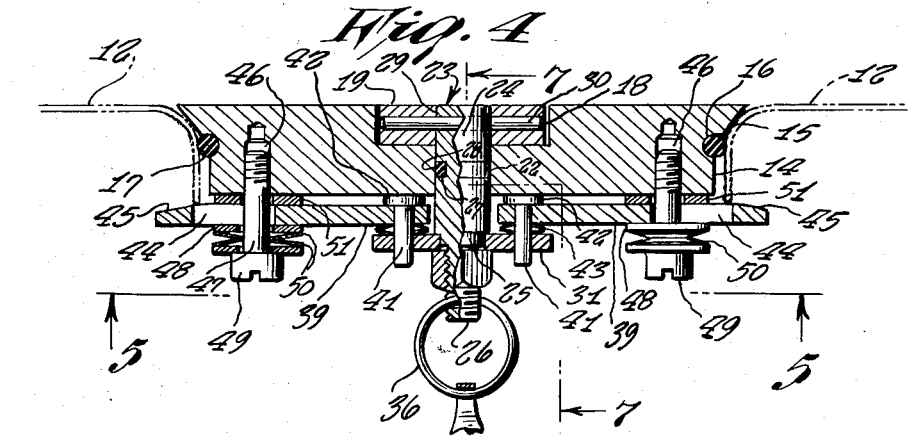
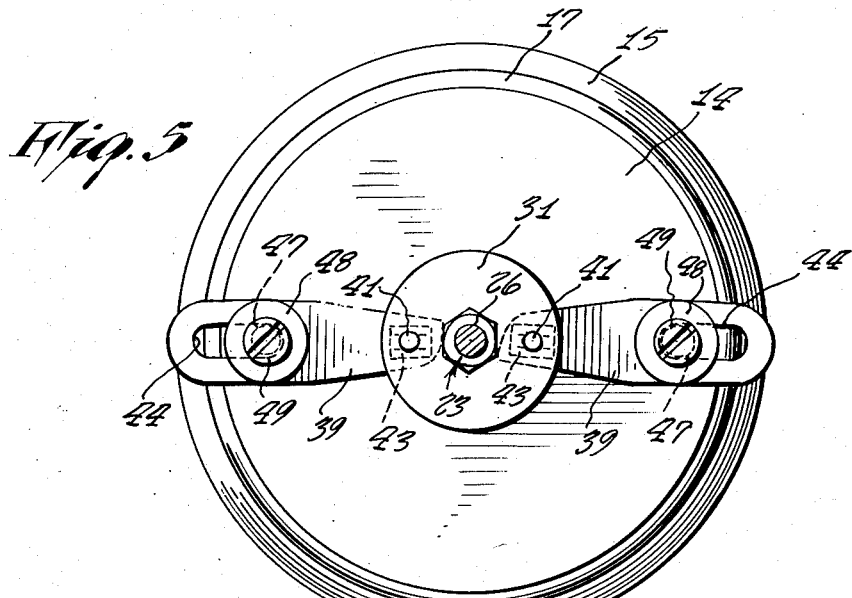
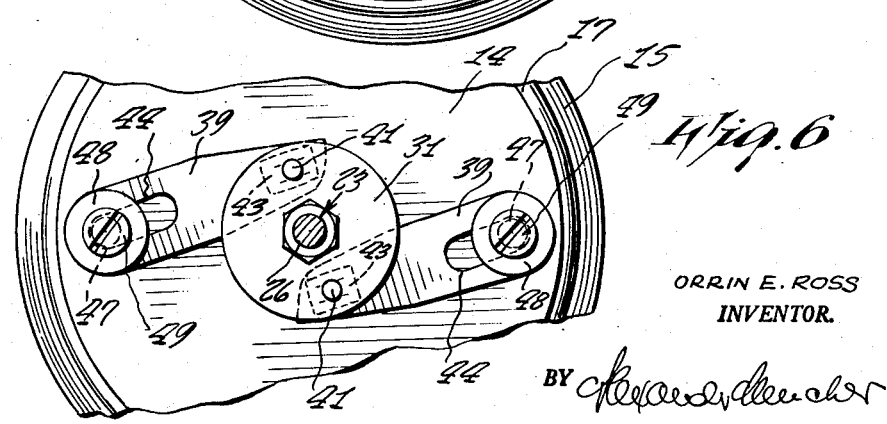
ORRIN E. ROSS
INVENTOR.
BY
ATTORNEY Dec. 4, 1956 — O. E. ROSS — 2,772,809
TANK FILLER CAP
Filed Feb. 5, 1954 — 3 Sheets-Sheet 3
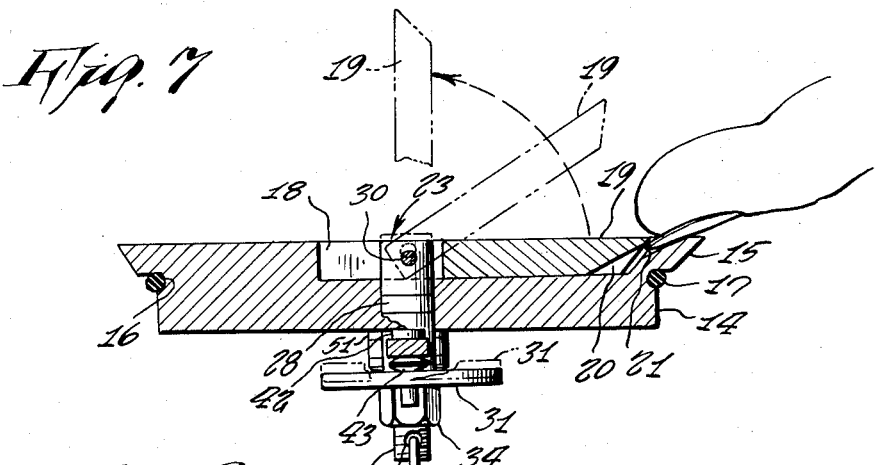
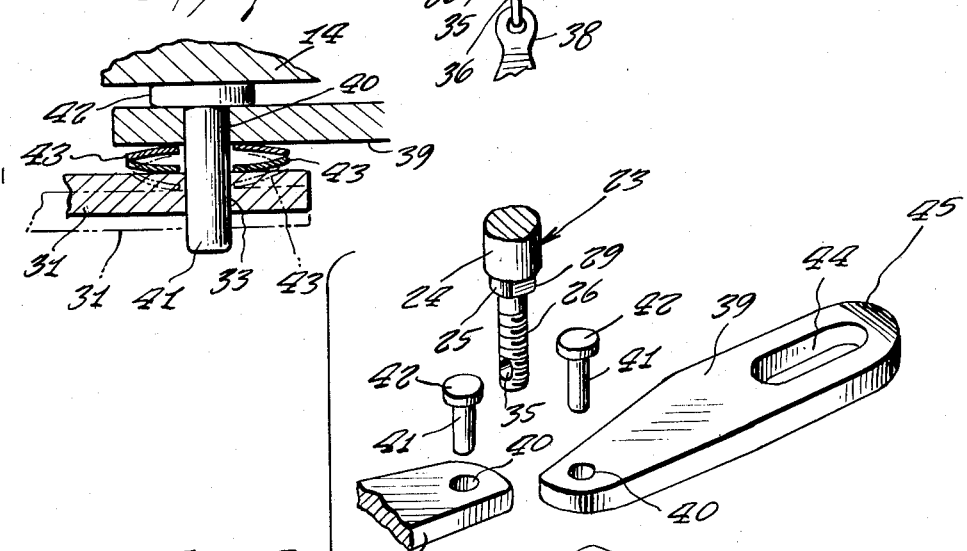
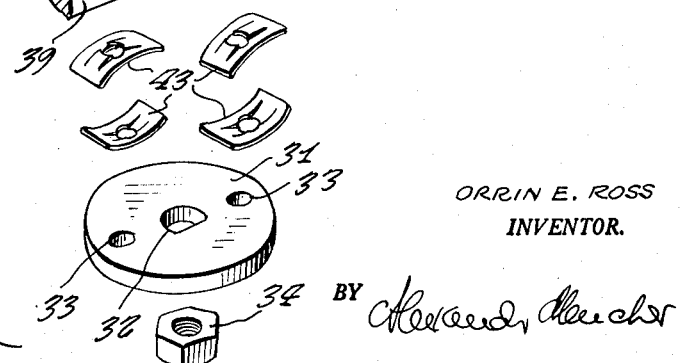
ORRIN E. ROSS
INVENTOR.
BY
ATTORNEY United States Patent Office 2,772,809
Patented Dec. 4, 1956

2,772,809

TANK FILLER CAP

Orrin E. Ross, Seaford, N. Y.

Application February 5, 1954, Serial No. 408,383

5 Claims. (Cl. 220—55)

This invention relates generally to a filler cap and more particularly to a filler cap for fuel, oil, gasoline or other type of tank or container.

The main object of the invention resides in the provision of a cap or plug for such tanks or containers which seals the same by a positive locking action and which is applicable and removable by hand without the use of tools.

A further object of the invention resides in the provision of such a type of cap or plug having a safety feature which will indicate by a quick visual inspection of the same whether or not the cap or plug is securely locked to the container by means of a warning device which cannot be concealed by hand manipulation until the cap or plug is properly secured for sealing purposes.

A further object of the invention resides in the provision of a cap or plug which is particularly adapted for airplane gasoline tanks and which cannot when the warning feature or handle is in closed position accidently become unlocked through vibration and which cannot be removed by hand when in such closed position.

A further object of the invention resides in the provision of a filler cap or plug for containers which is sturdy and durable in construction, reliable and efficient in operation, and inexpensive to manufacture and assemble.

For other objects and a better understanding of the invention, reference may be had to the following detailed description taken in connection with the accompanying drawing in which:

Figure 1 is a perspective view shown partly in section of a filler cap embodying the features of the present invention and shown in a locked position on the tank with the handle portion down;

Fig. 2 is a view similar to Fig. 1 showing the cap in a locked position but with the handle in an upstanding position;

Fig. 3 is a view similar to Fig. 1 but showing the handle in an upstanding position and the cap released from the tank opening;

Fig. 4 is a vertical sectional view taken along the line 4—4 of Fig. 1;

Fig. 5 is a bottom plan view taken along the line 5—5 of Fig. 4;

Fig. 6 is a fragmentary view similar to Fig. 5 but showing the cap in an unlocked position;

Fig. 7 is a vertical sectional view taken along the line 7—7 of Fig. 4 and showing in phantom the raised and intermediate positions of the handle;

Fig. 8 shows a portion of Fig. 4 on an enlarged scale and

Fig. 9 is an exploded perspective view of certain of the parts comprising the invention.

Referring now more in detail and to the drawings, and particularly to Fig. 1, there is indicated at 10 a gasoline tank for an airplane or the like having a circular opening 11.

A circular adapter 12 of substantially L-shaped cross section is mounted within the opening 11 by means of the rivets 13, a gasket 13a being shown therebetween.

A plug is provided for the adaptor 12 and includes a cylindrical portion 14 and a frusto-conical upper portion 15. The periphery of frustro-conical portion 15 bears on the adjacent surface of the adaptor 12 whereby to partially effect the closure (Fig. 4). The plug intermediate the cylindrical portion 14 and the frusto-conical portion 15 is provided with an annular groove 16 within which is resiliently positioned a rubber ring 17 to afford a liquid tight seal with the adapter 12. The plug or cap is provided on its upper surface with a recessed or grooved portion 18 receiving snugly therewithin a correspondingly shaped handle 19 with the upper face of the handle 19 lying flush with the upper face of the cap.

The outer end of the handle 19 on the under-surface thereof is provided with a nail-receiving portion 20, access to the nail-receiving portion 20 when the handle is in the lowered position of Fig. 1 being provided through a nail opening 21 provided in the plug or cap.

The central portion of the cap is provided with a bore 22 extending therethrough within which is rotatably positioned an axle indicated generally at 23. The axle 23 includes the cylindrical portion 24 which extends upwardly and downwardly through the cap (Fig. 7), a cylindrical extension 25 of less diameter than the portion 24 providing a shoulder, and an externally threaded portion 26 of less diameter than the cylindrical portion 25. The cylindrical portion 24 is provided with an annular groove 27 around which is positioned a rubber gasket 28 permitting a slight vertical movement of the axle within the opening 22 while at the same time preventing the escape upwardly around the axle of gasoline from the tank. The extension 25 is provided with a flat side 29 for a purpose which will hereinafter become clear.

As shown in Fig. 1, the handle 19 is provided with a cut out 29 at its inner end which receives the axle 23 therewithin, a transverse pin 30 (Fig. 4) pivotally connecting the handle to the axle.

A circular plate 31 provided at its center with a circular opening 32 having a flat side fits upwardly onto the extension 25, the plate 31 also being provided with diametrically opposed openings 33. The plate 31 is retained on the axle portion 25 by means of a nut 34 screwed upwardly on the threaded portion 26.

The axle 23 along its threaded portion 26 at the lower end thereof is provided with an opening 35 through which passes a ring 36. The ring 36 is connected to a ball chain 37 by means of an adaptor 38 (Fig. 1). The other end of the chain 37 is suitably connected to the interior of the tank whereby to prevent the cap from becoming lost when it is removed.

A pair of pawls or links 39 are pivotally connected to the plate 31 by means of openings 40 provided at their inner ends and pins 41 passing downwardly therethrough and through the openings 33 in the plate 31, downward displacement of the pins 41 through the openings 40, 33 being prevented by their enlarged heads 42 disposed intermediate the pawls 39 and the bottom of the cap (Fig. 4). Similarly, upward displacement of the pins is prevented by the abutment of the heads 42 with the undersurface of the cap. Spring washers 43 are provided on the pins 41 intermediate the plate 31 and pawls 39 which have the effect of biasing the axle 23 downwardly within the opening 22 and retaining thereby handle 19 in the lowered position.

The outer portions of each of the pawls 39 are provided with elongated slots 44, the upper surface of each of the pawls adjacent the outer ends of the slots 44 being tapered downwardly towards their extreme outer ends (Fig. 4), as at 45. The undersurface of the plug or cap is provided with a pair of diametrically opposed upwardly extending, internally threaded openings 46 in which are positioned the screws 47 (Fig. 4), the screws 47 passing through the elongated slots 44.

A pair of washers 48 are provided on each screw 47 between the heads 49 thereof and the undersurface of the pawls 39, complementary spring washers 50 being provided between each pair of washers 48. A washer 51 is provided on each screw 47 intermediate the upper surface of the pawls 39 and the undersurface of the plug.

It will be noted that when the parts are in the position of Figs. 4 and 5, the outer ends of the pawls 39 extend laterally beyond the depending circular edge of the adaptor 12, engaging the latter and preventing upward movement of the cap or plug in a positive manner. It will be noted that in this position of the pawls 39, the handle 19 is aligned with the recessed portion 18 of the cap and received downwardly therewithin. This is the locking position of the cap and in order to remove the same, it will be necessary to first insert a nail between the nail-receiving portions 20, 21 and to then raise the handle to the upright position of Fig. 2, whereupon the handle may then be rotated in the direction of the arrow of Fig. 3 to move the pawls 39 to the inoperative position of Fig. 6. The cap may then, of course, be removed. It will be noted from Fig. 7 that in order to raise the handle 19 to the vertical position, it will be necessary to move the axle 23 upwardly within the bore 22 to the dotted line position and to compress the spring washers 43. Thus, the handle 19 when in the raised position will be subjected to tension and will remain in the vertical position until snapped downwardly again. Thus, the handle will either assume the horizontal or the vertical position at all times and remain in such a position due to the tension of the spring washers 43.

In order to positively lock the filler cap on the tank, it is only necessary to rotate the upstanding handle 19 in a direction opposite to the arrow of Fig. 3 until it assumes the position of Fig. 2, in which case the pawls 39 are once more in the operative, locking position of Figs. 4 and 5. The handle is then snapped downwardly in the opposite direction from the arrow of Fig. 2 to assume the position of Fig. 1.

It will be noted that if the cap is placed into the adaptor and the upstanding handle 19 permitted to remain in the unlocked position of Fig. 3 it will be impossible to lower the handle until it has first been rotated to the locked position. Thus, an airplane pilot or mechanic by a quick visual inspection of the cap may tell whether or not it is locked positively on the tank.

The upper face of the handle 19 may be provided with suitable instructions regarding the movement of the same, for example "Lift and turn." The upper surface of the cap adjacent each side of the handle may also be provided with arrows indicating the direction in which the handle should be rotated to open or close the cap (Fig. 1).

The pin 30 is press fitted into the handle 19 and rotates freely within the axle 23, while upper edge of the bore 22 is slightly rounded.

It should now be apparent that there has been provided an improved filler cap or plug to seal fuel, oil or gasoline tanks and containers which is secured in place by hand by a positive locking action which prevents the cap from becoming loose through vibration and which cannot be removed by hand or tools when the warning handle is in closed position. It should also be apparent that there has been provided a filler cap or plug particularly adapted for airplane gasoline tanks wherein the pilot or mechanic can tell by a quick visual inspection whether the cap is positively locked in position or not and so designed that the handle or warning device cannot be lowered until the cap is properly secured.

While various changes may be made in the detail construction, it shall be understood that such changes shall be within the spirit and scope of the present invention as defined by the appended claims.

What is claimed is:

1. A filler cap for tanks or the like having a filler opening comprising an adaptor on the tank surrounding the filler opening therein, said adaptor being of substantially L-shaped cross section and presenting an inwardly extending substantially cylindrical opening, a plug adapted to fit within and close said cylindrical opening, a central axle rotatably mounted within said plug along the longitudinal axis of said cylindrical opening, the upper surface of said plug having a recessed portion surrounding the upper end of said axle, a handle adapted to fit within said recessed portion and having an opening at its inner end receiving the upper end of said axle, said handle and axle being pivotally connected, said axle extending downwardly through said plug, a plate secured to said axle below said plug, a plurality of pawls pivotally connected at their inner ends to the periphery of said plate, the outer ends of said pawls being adapted to extend beyond the lower edge of said adaptor surrounding said cylindrical opening when said handle is within said grooved portion whereby to prevent removal of said filler cap except by first raising and rotating said handle, said plate having a plurality of radially spaced openings, the inner end of each of said pawls having an opening aligned with one of said plate openings, pins within said aligned openings, each of said pins having an enlarged head disposed intermediate the upper surface of said pawls and the undersurface of said plug and spring washer means on each of said pins intermediate said plate and said pawls.

2. A filler cap for tanks or the like having a filler opening comprising an adaptor on the tank surrounding the filler opening therein, said adaptor being of substantially L-shaped cross section and presenting an inwardly extending substantially cylindrical opening, a plug adapted to fit within and close said cylindrical opening, a central axle rotatably mounted within said plug along the longitudinal axis of said cylindrical opening, the upper surface of said plug having a recessed portion surrounding the upper end of said axle, a handle adapted to fit within said recessed portion and having an opening at its inner end receiving the upper end of said axle, said handle and axle being pivotally connected, said axle extending downwardly through said plug, a plate secured to said axle below said plug, and a plurality of pawls pivotally connected at their inner ends to the periphery of said plate, the outer ends of said pawls being adapted to extend beyond the lower edge of said adaptor surrounding said cylindrical opening when said handle is within said grooved portion whereby to prevent removal of said filler cap except by first raising and rotating said handle, each of said pawls near its outer end having an elongated slot, fastening means secured to the under surface of said plug within each of said elongated slots, enlargements on the lower end of each of said fastening means and spring washer means on each of said fastening means intermediate said enlargements and the lower surface of said pawls.

3. A filler cap for tanks or the like having a filler opening comprising an adaptor on the tank surrounding the filler opening therein, said adaptor being of substantially L-shaped cross section and presenting an inwardly extending substantially cylindrical opening, a plug adapted to fit within and close said cylindrical opening, a central axle rotatably mounted within said plug along the longitudinal axis of said cylindrical opening, the upper surface of said plug having a recessed portion surrounding the upper end of said axle, a handle adapted to fit within said recessed portion and having an opening at its inner end receiving the upper end of said axle, said handle and axle being pivotally connected, said axle extending downwardly through said plug, a plate secured to said axle below said plug, a plurality of pawls pivotally connected at their inner ends to the periphery of said plate, the outer ends of said pawls being adapted to extend beyond the lower edge of said adaptor surrounding said cylindrical opening when said handle is within said grooved portion whereby to prevent removal of said filler cap except by first raising and rotating said handle, said plate having a plurality of radially spaced openings, the inner end of each of said pawls having an opening aligned with one of said plate openings, pins within said aligned openings, each of said pins having an enlarged head disposed intermediate the upper surface of said pawls and the undersurface of said plug and spring washer means on each of said pins intermediate said plate and said pawls, said axle within said plug having an annular groove and gasket means within said groove whereby to permit vertical displacement of said axle while preventing upward loss therearound of the tank contents.

4. A filler cap for tanks or the like having a filler opening comprising an adaptor on the tank surrounding the filler opening therein, said adaptor being of substantially L-shaped cross section and presenting an inwardly extending substantially cylindrical opening, a plug adapted to fit within and close said cylindrical opening, a central axle rotatably mounted within said plug along the longitudinal axis of said cylindrical opening, he upper surface of said plug having a recessed portion surrounding the upper end of said axle, a handle adapted to fit within said recessed portion and having an opening at its inner end receiving the upper end of said axle, said handle and axle being pivotally connected, said axle extending downwardly through said plug, a plate secured to said axle below said plug, a plurality of pawls pivotally connected at their inner ends to the periphery of asid plate, the outer ends of said pawls being adapted to extend beyond the lower edge of said adaptor surrounding said cylindrical opening when said handle is within said grooved portion whereby to prevent removal of said filler cap except by first raising and rotating said handle, said plate having a plurality of radially spaced openings, the inner end of each of said pawls having an opening aligned with one of said plate openings, pins within said aligned openings, each of said pins having an enlarged head disposed intermediate the upper surface of said pawls and the undersurface of said plug and spring washer means on each of said pins intermediate said plate and said pawls, each of said pawls at its outer end having an elongated slot, a screw depending from the undersurface of said plug within each of said elongated slots, a washer on each of said screws intermediate said plug and pawls, the thickness of said washer being substantially the same as the thickness of said enlarged heads of said pins, a pair of washers on each of said screws intermediate the heads thereof and said pawls, and spring washer means intermediate each of asid pair of washers.

5. A filler cap for tank openings comprising a plug adapted to be fitted snugly within the tank opening, a vertically-extending axle rotatably-mounted within the plug, said plug having a recess in its top surface with vertically-extending shoulders angularly spaced from one another, locking mechanism on the underside of said plug and actionable by the axle to engage the sides of the tank opening, a substantially correspondingly shaped handle pivotally connected to the upper end of the axle on an axis extending at right angles to the axle, said handle being adapted to pivot downwardly into and lie snugly within the recess in the upper surface of the plug, said recess being shaped so that the handle cannot be pivoted downwardly thereinto unless thes handle and axle have been turned to their full locking positions with one of the stop shoulders abutted by the handle and the locking mechanism engaging the sides of the tank opening, the other of said shoulders of the recess being engageable by the handle when raised upwardly out of the recess and turned to release the locking mechanism from the tank opening so that the plug may be removed therefrom, whereby a warning signal that the plug is not locked when the handle is out of the recess.

References Cited in the file of this patent

UNITED STATES PATENTS

| | | |
|---|---|---|
| 1,250,495 | Pandolfo | Dec. 18, 1917 |
| 2,172,169 | Claud-Mantle | Sept. 5, 1939 |
| 2,316,507 | Dykeman | Apr. 13, 1943 |
| 2,416,637 | Minella | Feb. 25, 1947 |
| 2,442,955 | Lundberg | June 8, 1948 |
| 2,541,653 | Jensen | Feb. 13, 1951 |
| 2,597,576 | Donovan | May 20, 1952 |

FOREIGN PATENTS

| | | |
|---|---|---|
| 237,775 | Great Britain | Aug. 6, 1925 |
| 556,954 | Great Britain | Oct. 28, 1943 |